United States Patent [19]
Yano

[11] Patent Number: 5,471,876
[45] Date of Patent: Dec. 5, 1995

[54] SEMICONDUCTOR ACCELEROMETER

[75] Inventor: Akihiro Yano, Tokyo, Japan

[73] Assignee: NEC Corporation, Tokyo, Japan

[21] Appl. No.: 964,030

[22] Filed: Oct. 21, 1992

[30] Foreign Application Priority Data

Oct. 23, 1991 [JP] Japan .................................. 3-302782

[51] Int. Cl.⁶ ........................................................ G01P 15/08
[52] U.S. Cl. .................................................... 73/514.33
[58] Field of Search ................................. 73/517 R, 515,
73/516 R, 517 B

[56] References Cited

FOREIGN PATENT DOCUMENTS 0456285  11/1991  European Pat. Off. ............. 73/517 R

OTHER PUBLICATIONS

Henry V. Allen et al., "Understanding Silicon Accelerometers". This paper is an expanded version of an article by the same authors which appeared in *Sensors*, Sep. 1989, pp. 17–31.

"A Batch-Fabricated Silicon Accelerometer", by L. M. Roylance, et al., IEEE Transactions on Electron Devices, vol. ED-26, No. 12, Dec. 1979, pp. 1911–1917.

*Primary Examiner*—Hezron E. Williams
*Assistant Examiner*—Christine K. Oda
*Attorney, Agent, or Firm*—Burns, Doane, Swecker & Mathis

[57] ABSTRACT

A structure of a semiconductor accelerometer which includes a body having a mass, beams for supporting the mass and gauge resistors provided on the beams, upper and bottom covering members sandwiching the body so as to form apertures over and under the mass and at least one through hole provided in at least any one of said upper and bottom covering members. Preferably, the through hole is provided at a center portion of the upper covering member. A probe passes through the through hole and the mass is pressed down with the top of the probe by which a predetermined strain is caused at the beams having the gauge resistors. This permits a measurement of the characteristic of the output voltage to the variation of the mass in the vertical direction.

6 Claims, 3 Drawing Sheets

SEMICONDUCTOR ACCELEROMETER

BACKGROUND OF THE INVENTION

The invention relates to a semiconductor accelerometer, and more particularly to a semiconductor accelerometer having a structure suitable for a measurement of electrical output characteristics and a method of testing electrical output characteristics thereof.

Semiconductor accelerometers have been used for the measurement of the acceleration caused by a shock of a movement of a body. FIGS. 1 and 2 illustrate a structure of the semiconductor accelerometer in the prior art. Such semiconductor accelerometers essentially includes a sensor substrate 1, an upper covering member 15 which overlays the sensor substrate 1 and a bottom covering member 16 which underlies the sensor body 1. The sensor substrate 1 is provided at its uncovered upper surface with a plurality of bonding pads 4. The sensor substrate 1 essentially comprises a frame, a mass 9, beams 8 provided at opposite ends of the mass for supporting the mass 9 and gauge resistors 10 provided on the beams 8. The semiconductor accelerometer has apertures 6 and 7 between the sensor substrate 1 and the both covering members 15 and 16 respectively thereby allowing the mass 9 to be oscillated in the vertical direction. The upper covering member 15 is formed at its upper surface with a sensor chip 21. The sensor substrate 1 is formed by techniques such as etching so as to make the beams 8 to be very thin. The upper and under covering members 15 and 16 prevent the mass 9 to have over amplitude of the oscillation by an over-shock. The gauge resistors 10 are formed by using photolithography.

With the operation of the accelerometer, when an acceleration in the vertical direction is applied to the accelerometer, the oscillation of the mass 9 is caused by the inertial resistance of the mass 9. The variation of the mass 9 causes the beams 8 to have a strain by which the resistivity of the each gauge resistor 10 is varied. The variation of the resistivity of the gauge resistors 10 is converted into electrical signals, and thus the magnitude of the shock, or the acceleration may be converted into electrical signals thereby resulting in an accomplishment of the measurement of the acceleration.

The accomplishment of the correct measurement performance requires the accelerometer to take a test of the electrical output characteristics. In the prior art, the test of the electrical output characteristics is accomplished by oscillating the accelerometer with a vibrator in which the sensor chip 21 is mounted to the vibrator to apply the acceleration, or shock to the mass 9. Thus, the sensor chip 21 is required to securely be mounted to the vibrator by using an adhesive or the like in order to prevent a resonant oscillation of the sensor chip 21 to be caused. The test of the electrical output characteristics also requires the sensor chip 21 to be either mounted or dismounted to the vibrator. The mount by use of the adhesive renders the mount and dismount of the sensor chip 21 to the vibrator inconvenient. In view of ability of the vibrator, it is difficult for the prior art to mount a number of sensor chips 21 to the vibrator. It is thus difficult to accomplish concurrent measurements of characteristics of a number of accelerometers.

SUMMARY OF THE INVENTION

Accordingly, it is a primary object of the present invention to provide an accelerometer having a novel structure suitable for testing electrical output characteristics.

It is another object of the present invention to provide a novel method of measurement of electric output characteristics without applying an acceleration to the accelerometer.

It is a further object of the present invention to provide a novel method of regulation of electric output characteristics without applying an acceleration to the accelerometer.

The above and other objects, features and advantages of the present invention will be apparent from following descriptions.

In accordance with the present invention, a novel structure of a semiconductor accelerometer comprises a body, upper and bottom covering members and at least one through hole provided in at least any one of the upper and bottom covering members. The body comprises a mass, beams for supporting the mass and gauge resistors provided on the beams. The upper and bottom covering members sandwich the body so as to form apertures over and under the mass. The novel structure of the semiconductor accelerometer is manifested in the through hole. Preferably, the through hole is provided at a center portion of the upper and/or bottom covering member.

With regard to the testing of the accelerometer, a probe is inserted into the covering member through the through hole. The probe passes through the through hole and the mass is pressed with the top of the probe with which a predetermined load is applied to the mass. When the mass is pressed down, a predetermined strain is caused at the beams having the gauge resistors. This causes the resistivity of the gauge resistors to be varied. The variation of the resistivity of the gauge resistors generates a predetermined output voltage. This permits a measurement of the characteristic of the output voltage against the variation of the mass in the vertical direction. This novel method of testing electrical output characteristics is, therefore, free from applying an acceleration to the semiconductor accelerometer, and thus the measurement of the electrical output characteristics against the variation of the mass in the vertical direction is accomplished without using the vibrator.

BRIEF DESCRIPTION OF THE DRAWINGS

Preferred embodiments of the present invention will hereinafter fully be described in detail with reference to the accompanying drawings.

PREFERRED EMBODIMENTS OF THE INVENTION

Figure 1:
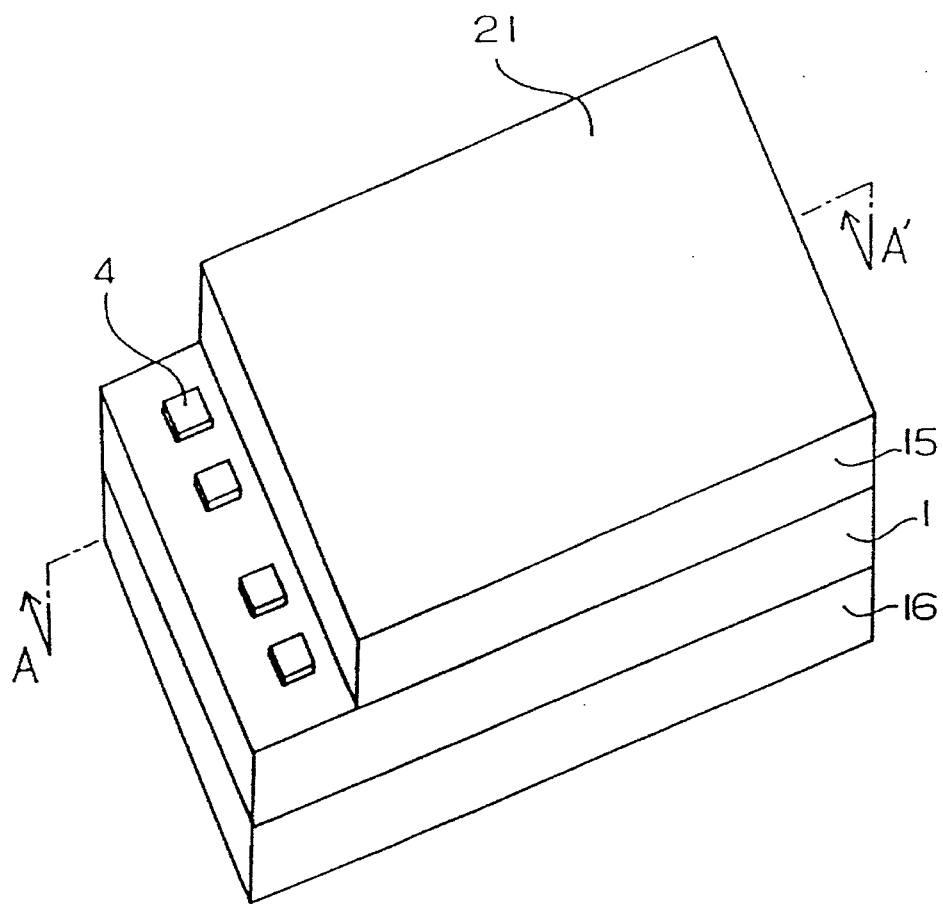
FIG. 1 is a perspective view illustrative of the semiconductor accelerometer in the prior art.
Figure 2:
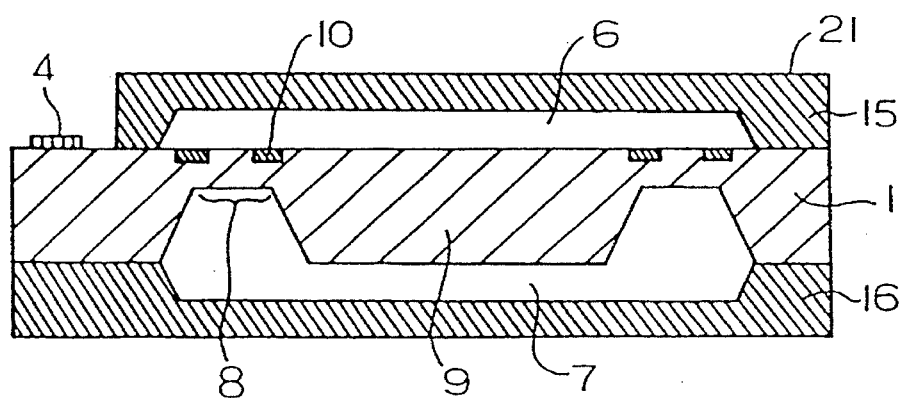
FIG. 2 is a cross sectional elevation view taken along line A–A' of FIG. 1 illustrative of the semiconductor accelerometer in the prior art.
Figure 3:
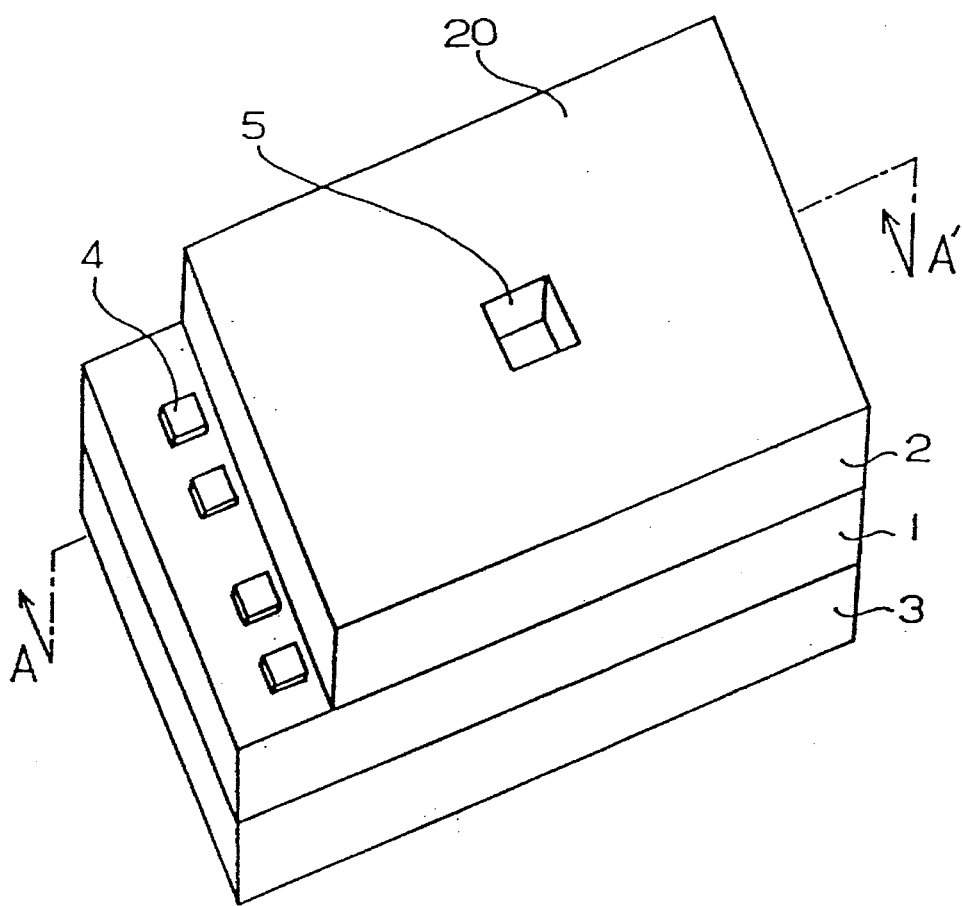
FIG. 3 is a perspective view illustrative of a novel semiconductor accelerometer of one embodiment according to the present invention.

The structure of the semiconductor accelerometer of one embodiment according to the present invention will now be described with reference to FIGS. 3 and 4. A novel structure of a semiconductor accelerometer is manifested in a through hole 5. The semiconductor accelerometer essentially comprises a sensor substrate 1 serving as a body, an upper covering member 2 which overlays the sensor substrate 1 and a bottom covering member 3 which underlies the sensor body 1. The sensor substrate 1 is provided at its uncovered upper surface with a plurality of bonding pads 4. The upper covering member 2 is provided at its upper surface with sensor ship 20. The upper covering member 2 is also formed at its center portion with a through hole 5.

Figure 4:
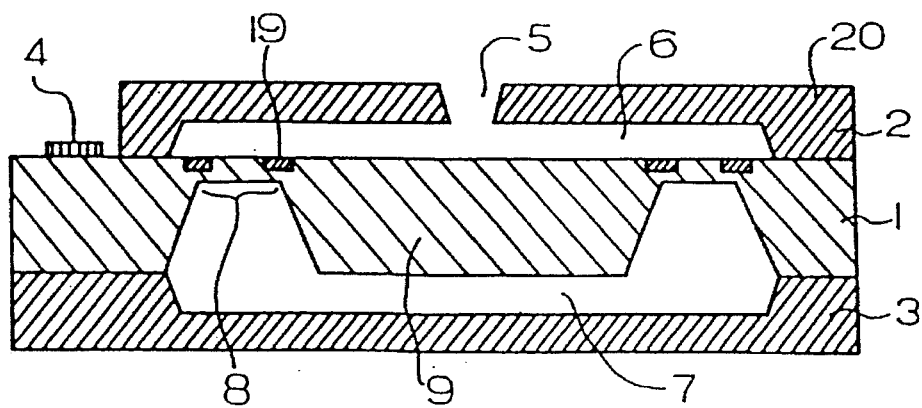
FIG. 4 is a cross sectional elevation view taken along line A–A' of FIG. 3 illustrative of a novel semiconductor accelerometer of one embodiment according to the present invention.

Referring to FIG. 4, the sensor substrate 1 essentially comprises a frame, a mass 9, beams 8 provided at opposite ends of the mass for supporting the mass 9 and gauge resistors 10 provided on the beams 8. The sensor substrate 1 is sandwiched by the upper and bottom covering members 2 and 3 so as to have apertures or spaces 6 and 7 between the sensor substrate 1 and the both covering members 2 and 3 respectively thereby allowing the mass 9 to be oscillated in the vertical direction. The upper and bottom covering member also serve to support the mass 9 and thus suppress the mass 9 to have an over amplitude caused by an over shock. The sensor substrate 1 is formed by techniques such as etching so as to make the beams 8 to be very thin. The gauge resistors 19 are formed by using photolithography on the beams 8 to sense a strain caused at the beams 8 by the variation of the mass 9 in the vertical direction.

The upper covering member 2 may be provided with the through hole 5 at least directly over the mass 9. Preferably, as illustrate in FIGS. 3 and 4, the through hole 5 is provided at a center portion of the upper covering member 2, through which a slender pin such as a probe is inserted for the measurement of the output characteristics of the semiconductor accelerometer. The through hole 5 has a predetermined dimension which permits the probe to pass through the upper covering member 2.

Figure 5:
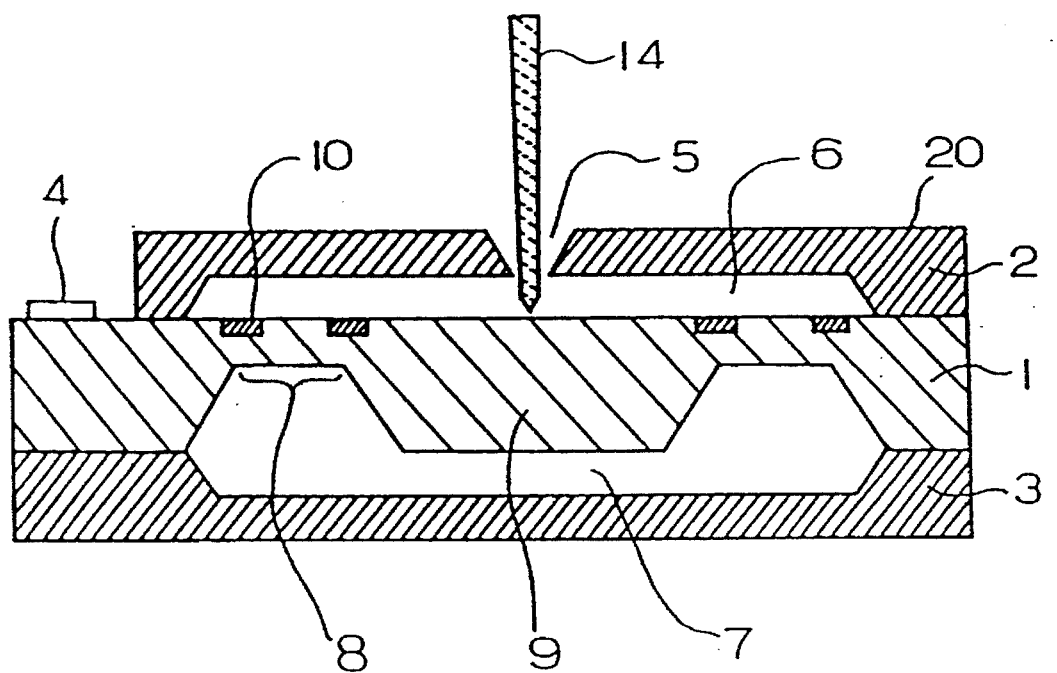
FIG. 5 is a cross sectional elevation view taken along line A–A' of FIG. 3 illustrative of a novel method of a measurement of electrical output characteristics of a semiconductor accelerometer according to the present invention.

The testing method and performance of the semiconductor accelerometer will subsequently be described with reference to FIG. 5. A probe 14 is prepared to apply a predetermined load to the mass 9. The probe 14 passes through the through hole 5 and the mass 9 is pressed down with the top of the probe 14 with which a predetermined load is applied to the mass 9. When the mass 9 is pressed down by the predetermined load, the variation of the mass 9 in the vertical direction causes the beams 8 involving the gauge resistor 10 to have a predetermined strain by which the resistivity of the gauge resistors 10 are subjected to a predetermined variation. The variation of the resistivity of the gauge resistors 10 generates a predetermined output voltage. This permits the measurement of the characteristic of the output voltage generated from the gauge resistor against the variation of the mass in the vertical direction. As a result of the measurement, if undesirable characteristics of the output voltage are obtained, a regulation of the output voltage from the gauge resistor is accomplished.

The novel method of the measurement of the characteristic of the output voltage against the variation of the mass 9 in the vertical direction is free from using the vibrator, and thus mounting and dismounting the sensor chip 20 to the vibrator. The novel method of the test of the semiconductor accelerometer and thus the measurement of the electrical output characteristics of the gauge resistor 10 against the variation of the mass 9 in the vertical direction may readily be accomplished by only pressing down the mass 9 with the probe 14 through the through hole 5. Thus, this novel method according to the present invention permits the electrical output characteristics of a number of the semiconductor accelerometers to be measured within a short time.

Alternatively, the through hole 5 may be provided in the bottom covering member 3, although the structure is not illustrated. In this case, the probe 14 passes through the through hole formed in the bottom covering member 3 and the mass 9 is pressed up with the top of the probe 14 with which a predetermined load is applied to the mass 9. When the mass 9 is pressed up by the predetermined load, the variation of the mass 9 in the vertical direction causes the beams 8 involving the gauge resistor 10 to have a predetermined strain by which the resistivity of the gauge resistors 10 are subjected to a predetermined variation. The variation of the resistivity of the gauge resistors 10 generates a predetermined output voltage. This permits the measurement of the characteristic of the output voltage generated from the gauge resistor against the variation of the mass in the vertical direction.

In addition, the through holes 5 may be provided in the both upper and bottom covering members 2 and 3, although the structure is not illustrated. In this case, the probe 14 passes through either the through holes formed in the both upper bottom covering members 2 and 3. The mass 9 is pressed down or up with the top of the probe 14 with which a predetermined load is applied to the mass 9. When the mass 9 is pressed down or up by the predetermined load, the variation of the mass 9 in the vertical direction causes the beams 8 involving the gauge resistor 10 to have a predetermined strain by which the resistivity of the gauge resistors 10 are subjected to a predetermined variation. The variation of the resistivity of the gauge resistors 10 generates a predetermined output voltage. This permits the measurement of the characteristic of the output voltage generated from the gauge resistor against the variation of the mass in the vertical direction.

While in the above embodiments the through hole 5 for the probe 14 exists at the center portion of the upper or bottom members 2 or 3, the through hole 5 is provided directly over or under the mass 9 so that the probe 14 presses down or up the mass 9. The number of the through holes 5 may be varied by matching various conditions.

Whereas modifications of the present invention will no doubt be apparent to a person of ordinary skilled in the art, it is to be understood that the embodiments shown and described by way of illustration are by no means intended to be considered in a limiting sense. Accordingly, it is to be intended by the claims to cover all modifications of the invention which fall within the spirit and scope of the invention.

What is claimed is:

1. A semiconductor accelerometer comprising:

a body comprising a mass, beams for supporting said mass and gauge resistors provided on said beams;

upper covering member and bottom covering member enclosing said body so as to form spaces over and under said mass; and at least one through hole provided in at least one of said upper covering member and bottom covering member at a location where an elongated probe inserted through said through hole comes into direct contact with said mass to thereby apply a predetermined load.

2. The semiconductor accelerometer as claimed in claim 1, wherein said through hole is provided in said upper covering member directly over said mass.

3. The semiconductor accelerometer as claimed in claim 2, wherein said through hole is provided at a center portion of said upper covering member.

4. The semiconductor accelerometer as claimed in claim 1, wherein said through hole is provided in said bottom covering member directly under said mass.

5. The semiconductor accelerometer as claimed in claim 4, wherein said through hole is provided at a center portion of said bottom covering member.

6. The semiconductor accelerometer as claimed in claim 1 wherein said spaces enclose air, said air acting as an air dampener for said mass.

* * * * *